United States Patent
Fortin et al.

(10) Patent No.: US 7,647,147 B2
(45) Date of Patent: Jan. 12, 2010

(54) MULTI-PLATFORM DATA COMMUNICATION INTERFACE WITH SELF-RECOGNIZING AND SELF-LEARNING OF THE HOST VEHICLE

(75) Inventors: Jacques Fortin, Montreal (CA); Jean-Pierre Aubertin, Laval (CA); Philippe Meilleur, Montreal (CA); Martin Tessier, Laval (CA); Patrick Nöel, Ste-Marthe-sur-le-Lac (CA); Mihn Nguyen, Montreal (CA)

(73) Assignee: Fortin Auto Radio Inc., Saint-Léonard (CA)

( * ) Notice: Subject to any disclaimer, the term of this patent is extended or adjusted under 35 U.S.C. 154(b) by 0 days.

(21) Appl. No.: 11/598,764

(22) Filed: Nov. 14, 2006

(65) Prior Publication Data

US 2007/0118623 A1    May 24, 2007

(51) Int. Cl.
*G06F 7/00*    (2006.01)

(52) U.S. Cl. .............. 701/36; 701/33; 701/29; 340/438; 340/439

(58) Field of Classification Search .......... 701/27, 701/29, 33, 35, 36; 706/913, 917; 340/425.5, 340/438, 439
See application file for complete search history.

(56) References Cited

U.S. PATENT DOCUMENTS

| | | | |
|---|---|---|---|
| 6,434,458 B1 * | 8/2002 | Laguer-Diaz et al. | 701/35 |
| 6,609,051 B2 * | 8/2003 | Fiechter et al. | 701/33 |
| 6,629,029 B1 * | 9/2003 | Giles | 701/35 |
| 7,327,228 B2 * | 2/2008 | Min et al. | 340/426.1 |
| 2006/0047380 A1 * | 3/2006 | Welch | 701/29 |
| 2007/0083303 A1 * | 4/2007 | O'Sullivan et al. | 701/29 |
| 2008/0182570 A1 * | 7/2008 | Kuhl | 455/422.1 |

* cited by examiner

*Primary Examiner*—Gertrude Arthur Jeanglaud
(74) *Attorney, Agent, or Firm*—Goudreau Gage Dubuc; Gonzalo Lavin

(57) ABSTRACT

A data communication interface connectable between a vehicle function-specific electronic device and a control module of a vehicle. The data communication interface includes a first programmable hardware for receiving signals from the control module of the vehicle and recognizing an identity of the vehicle based on the received signals. The data communication interface also includes a second programmable hardware for establishing a bi-directional connection between the vehicle function-specific electronic device and the control module of the vehicle when the identity of the vehicle is recognized.

3 Claims, 2 Drawing Sheets

MULTI-PLATFORM DATA COMMUNICATION INTERFACE WITH SELF-RECOGNIZING AND SELF-LEARNING OF THE HOST VEHICLE

FIELD OF THE INVENTION

The present invention relates to a multi-platform data communication interface system connected to a vehicle that are used by installers to add, for example a new vehicle starter or a new vehicle alarm.

BACKGROUND OF THE INVETION

Known multi-platform data communication interfaces require the installer to select the operating mode in regard of a look-up table with physical jumpers as an example. Some products also need a manual adjustment of analog voltages, like it is the case in passlock modules.

SUMMARY OF THE INVENTION

According to the present invention, there is provided a data communication interface connectable between a vehicle function-specific electronic device and a control module of a vehicle, said data communication interface comprising:
  first programmable hardware means for receiving signals from the control module of the vehicle and recognizing an identity of the vehicle based on the received signals; and
  second programmable hardware means for establishing a bi-directional connection between the vehicle function-specific electronic device and the control module of the vehicle when the identity of the vehicle is recognized.

Preferably, the vehicle function-specific electronic device is a remote starter alarm device or a remote starter device or a single alarm device or any other similar electronic device that an installer adds to a vehicle.

Preferably, the control module of the vehicle is a Body Control Module (BCM) or an Engine Control Module (ECM) or any other similar electronic module(s) or vehicle control(s)/status wiring or any combination of such connections.

Preferably, the data communication interface is integrated into the vehicle function-specific electronic device. Alternatively, the data communication interface is provided separately from the vehicle function-specific electronic device.

Preferably, the data communication interface includes a single or multiple connection ports for programmable card or data loading port by Internet. The ports may be located on the side of the data communication interface.

Preferably, the first programmable hardware means includes:
  data strings identifying means for recognizing the identity of the vehicle from presence of specific data strings on vehicle wires;
  querying and identity identifying means for querying the control module of the vehicle and recognizing the identity of the vehicle;
  analog voltage identifying means for recognizing the identity of the vehicle from analog voltages from the vehicle;
  analog timing identifying means for recognizing the identity of the vehicle from presence of specific analog timing(s) on vehicle wires;
  sequence identifying means for recognizing the identity of the vehicle from presence of specific sequence(s) on vehicle wires;
  data strings timing identifying means for recognizing the identity of the vehicle from presence of specific data strings sequence(s) on vehicle wires; and
  data strings sequence identifying means for recognizing the identity of the vehicle from presence of specific data strings sequence(s) on vehicle wires.

Preferably, the data communication interface needs or does not need actions to be performed in the vehicle in order to identify the host vehicle.

Preferably, the data communication interface recognizes the vehicle from any other specific characteristic of the vehicle.

Preferably, the data communication interface can handle different car makes and/or models and/or years of fabrications. In this way, the data communication interface can automatically recognize the vehicle to which it is connected for remote starting motor vehicles, alarms, or any other aftermarket motor vehicle application.

Preferably, the data communication interface can be a single entity by itself or integrated into another system, like, but not limited to, a remote motor vehicle starter, a motor vehicle alarm, or other similar devices.

The invention as well as its numerous advantages will be better understood by reading of the following non-restrictive description of preferred embodiments made in reference to the enclosed drawings.

DETAILED DESCRIPTION OF THE INVENTION

Figure 1:
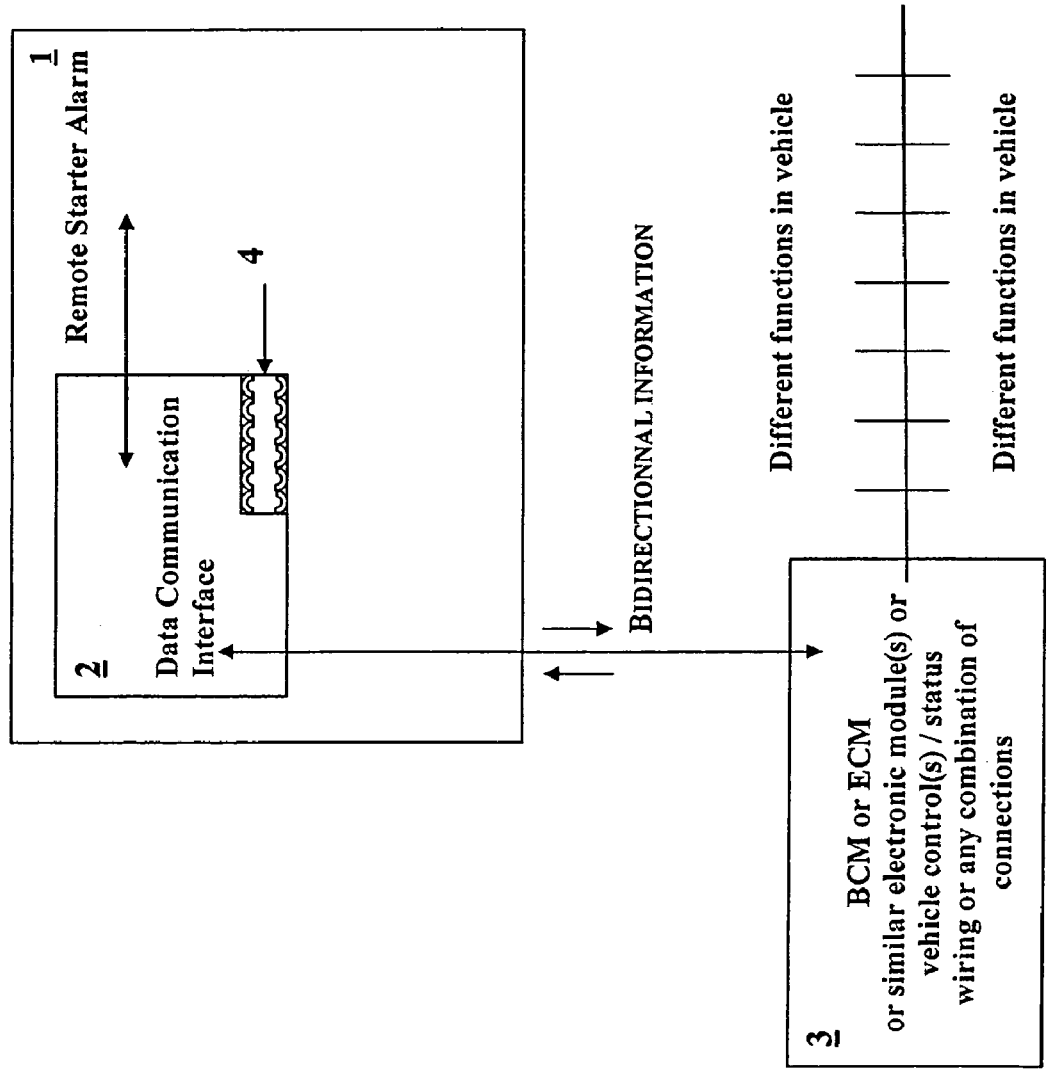
FIG. 1 is a schematic bloc diagram of a data communication interface being integrated in a remote starter alarm or similar electronic device of a vehicle to do single or multiple functions, according to a preferred embodiment of the present invention.

Referring to FIG. 1, there is shown a data communication interface 2 connectable between a vehicle function-specific electronic device 1 and a control module 3 of a vehicle. The data communication interface 2 includes a first programmable hardware for receiving signals from the control module 3 of the vehicle and recognizing an identity of the vehicle based on the received signals. The data communication interface 2 also includes a second programmable hardware for establishing a bi-directional connection between the vehicle function-specific electronic device 1 and the control module of the vehicle 3 when the identity of the vehicle is recognized.

Preferably, the vehicle function-specific electronic device 1 is a remote starter alarm device or a remote starter device or a single alarm device or any other similar electronic device that an installer adds to a vehicle.

Preferably, the control module of the vehicle is a Body Control Module (BCM) or an Engine Control Module (ECM) or any other similar electronic module(s) or vehicle control(s)/status wiring or any combination of such connections.

Preferably, the data communication interface is integrated into the vehicle function-specific electronic device. Alternatively, the data communication interface is provided separately from the vehicle function-specific electronic device.

Preferably, the data communication interface includes a single or multiple connection ports 4 for programmable card or data loading port by Internet. The ports 4 may be located on the side of the data communication interface.

Preferably, the first programmable hardware includes:
  data strings identifying means for recognizing the identity of the vehicle from presence of specific data strings on vehicle wires;
  querying and identity identifying means for querying the control module of the vehicle and recognizing the identity of the vehicle;
  analog voltage identifying means for recognizing the identity of the vehicle from analog voltages from the vehicle;
  analog timing identifying means for recognizing the identity of the vehicle from presence of specific analog timing(s) on vehicle wires;
  sequence identifying means for recognizing the identity of the vehicle from presence of specific sequence(s) on vehicle wires;
  data strings timing identifying means for recognizing the identity of the vehicle from presence of specific data strings sequence(s) on vehicle wires; and
  data strings sequence identifying means for recognizing the identity of the vehicle from presence of specific data strings sequence(s) on vehicle wires.

Preferably, the data communication interface needs or does not need actions to be performed in the vehicle in order to identify the host vehicle.

Preferably, the data communication interface recognizes the vehicle from any other specific characteristic of the vehicle.

Preferably, the data communication interface can handle different car makes and/or models and/or years of fabrications. In this way, the data communication interface can automatically recognize the vehicle to which it is connected for remote starting motor vehicles, alarms, or any other aftermarket motor vehicle application.

Preferably, the data communication interface can be a single entity by itself or integrated into another system, like, but not limited to, a remote motor vehicle starter, a motor vehicle alarm, or other similar devices.

Referring back to FIG. 1, the remote starter alarm or vehicle function-specific electronic device 1 is used to control different commands required in functions to enable a vehicle to do certain functions necessary for the application required, or any other motor vehicle aftermarket system. The data communication interface 2 supports multiple vehicle platforms, which may or may not be included in the remote starter alarm 1. The control module of the vehicle 3 may include the existing vehicle control(s) or electronic module(s) or vehicle wiring. In the present example, the data communication interface 2 is integrated in the remote starter alarm 1. The data communication interface 2 uses self-learning (SL) technology in association with a remote starter or alarm system or other device in a motor vehicle to do single or multiple functions, with optionally included program or external programmable card or similar device.

Preferably, a programmable unit integrates a remote starter or remote alarm 1 and the data communication interface 2. The programmable unit 1, 2 may also include a receiver socket 4 for downloading information from the Internet or to add an already programmed card to the remote starter or alarm. The socket may be on the side of the unit 1, 2. The unit 1, 2 could be programmed in 3 ways:
  1. By module manufacturer on programming socket 4;
  2. By an external already programmed card based by motor vehicle model/year at the time of installation;
  3. By the internet.

All three could be using the same socket 4 on different occasions for different functions in order to program the remote starter or vehicle alarm for a particular brand or model/year of motor vehicle.

The advantage of programming the unit 1, 2 according to ways No. 2-3 is that it would prevent to pay royalties before the time the unit 1, 2 is actually installed and programmed.

Figure 2:
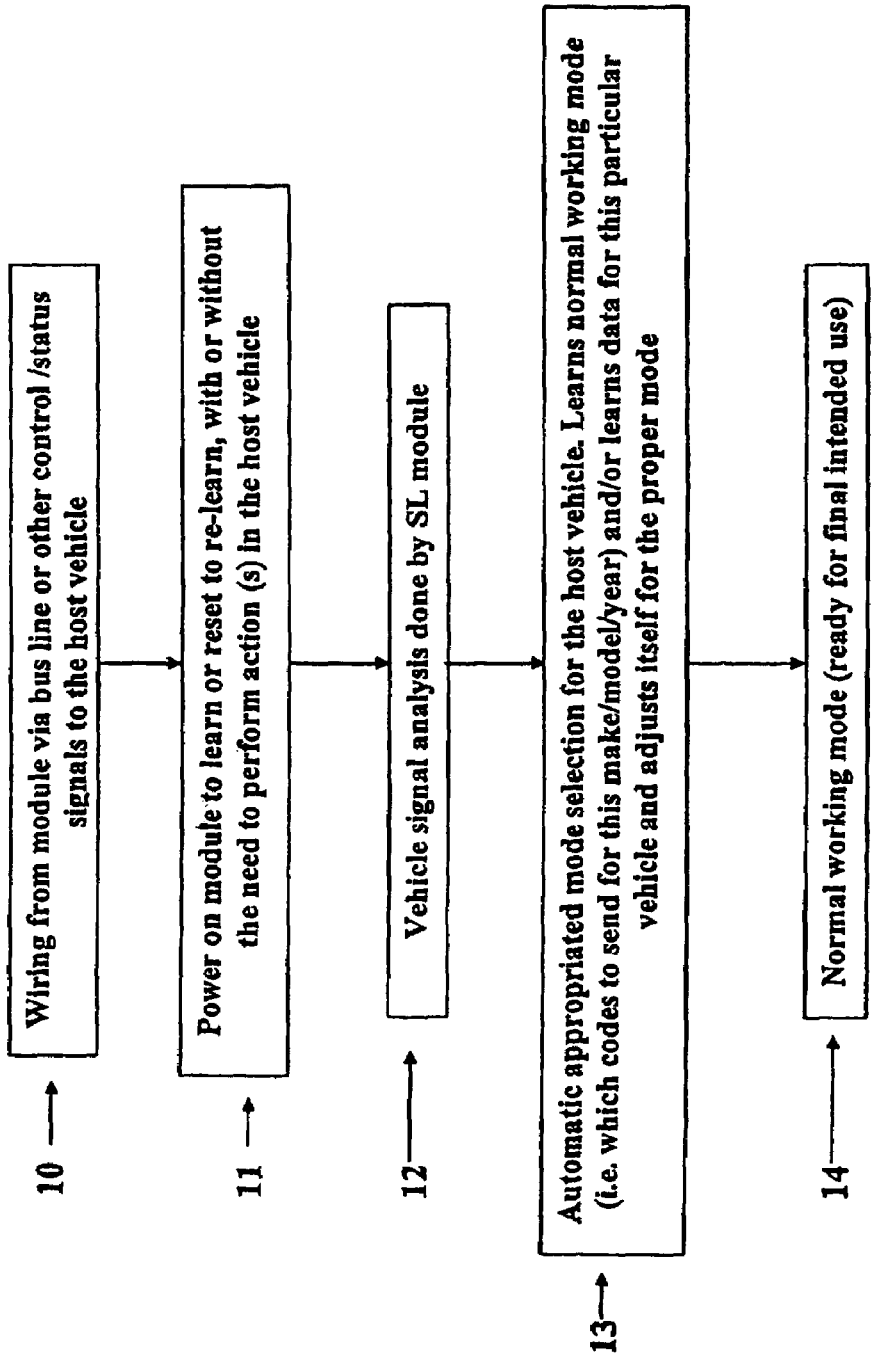
FIG. 2 is a flow chart of steps of use of the data communication interface.

Referring to FIG. 2, there is shown a logic diagram of selection of the appropriate mode for the host vehicle. The logic diagram may include of the following elements that are numbered accordingly in FIG. 2:
  10. The appropriate wiring to the host vehicle is done;
  11. The Power On or module reset is done, with or without the need to be pressing a switch, with or without the need to perform action(s) in the host vehicle;
  12. A vehicle signal analysis is done;
  13. The appropriated selection mode for the host vehicle is done automatically from a pre-established coded algorithm;
  14. The multiple platform data communication interface is now working in the meaning of its intended use.

In the case of the Passlock SL, a module according to a preferred embodiment of the present invention automatically selects the analog voltage and the operating mode from observed timings. For other SL Technology modules, a module according to a preferred embodiment of the present invention detects special conditions in the vehicle in order to select automatically the appropriate operating mode for this particular vehicle in which it is installed.

The advantages of the present invention are plural: easier installation, trouble free, not requiring to manually select an operating mode from a look up table which also reduces the possibilities of errors. When a mode is automatically selected with success, the installer can feel confident about his installation.

Generally speaking, data communication interfaces modules are intended to eliminate relays, wiring, costs in manufacturing of remote starters, alarms and similar devices.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A data communication interface for an aftermarket motor vehicle application, said data communication interface being connectable between a vehicle function-specific electronic device and a control module of the vehicle, said data communication interface comprising:
  first programmable hardware means for receiving signals from the control module of the vehicle and recognizing an identity of the vehicle based on the received signals; and
  second programmable hardware means for establishing a bi-directional connection between the vehicle function-specific electronic device and the control module of the vehicle when the identity of the vehicle is recognized.

2. The data communication interface according to claim 1, further comprising a connection port for programming the vehicle function-specific electronic device via a programmable card.

3. The data communication interface according to claim 1, further comprising a connection port for programming the vehicle function-specific electronic device via an Internet data loading port.

* * * * *

UNITED STATES PATENT AND TRADEMARK OFFICE
CERTIFICATE OF CORRECTION

PATENT NO. : 7,647,147 B2  Page 1 of 1
APPLICATION NO. : 11/598764
DATED : January 12, 2010
INVENTOR(S) : Fortin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 33 days.

Signed and Sealed this

Twenty-eighth Day of December, 2010

David J. Kappos
*Director of the United States Patent and Trademark Office*